United States Patent [15] 3,676,746
Kassabgi et al. [45] July 11, 1972

[54] COMPATIBLE MODULAR CIRCUIT BOARD CONNECTOR

[72] Inventors: Georges Kassabgi, Paris, France; Giampiero Compare, Milano, Italy

[73] Assignee: Honeywell Information Systems Italia, Milan, Italy

[22] Filed: Dec. 23, 1970

[21] Appl. No.: 100,987

[52] U.S. Cl.................317/101 CC, 317/101 DH, 339/17 LC
[51] Int. Cl.........................................H05k 7/02, H05k 1/14
[58] Field of Search...............317/101 CC, 101 CB, 101 DH, 317/117, 118; 339/17 C, 17 CF, 17 F, 17 M, 17 LM, 17 LC

[56] References Cited

UNITED STATES PATENTS 2,945,989 7/1960 Vogel..............................317/101 DH
2,880,379 3/1959 Stoddart..........................317/101 CB
2,871,457 1/1959 Jencks.............................317/101 CB
3,573,704 4/1971 Tarver..................................339/17 F
3,245,546 4/1966 Stuhler............................317/101 DH

FOREIGN PATENTS OR APPLICATIONS 897,999 6/1962 Great Britain ..................317/101 DH

*Primary Examiner*—Lewis H. Myers
*Assistant Examiner*—Gerald P. Tolin
*Attorney*—Fred Jacob, Ronald T. Reiling and Lewis P. Elbinger

[57] ABSTRACT

A modular structure for providing connections between a plurality of printed circuit boards, wherein connectors for remote connection cables are supported directly on a circuit board.

6 Claims, 4 Drawing Figures

Georges KASSABGI
Giampiero COMPARE
INVENTORS

By [signature]
ATTORNEY

Georges KASSABGI
Giampiero COMPARE
INVENTORS
By [signature]
ATTORNEY

Georges KASSABGI
Giampiero COMPARE
INVENTORS
By [signature]
ATTORNEY

COMPATIBLE MODULAR CIRCUIT BOARD CONNECTOR

BACKGROUND OF THE INVENTION

The present invention concerns electric connections between distinct parts of complex electronic apparatus, and particularly between various units in data processing systems.

It is known that in the electrical connection of distinct units in electronic apparatus built according to modern criteria of standardization, with repetitive use of printed circuit cards or boards, a great many difficulties are encountered.

First, the large number of signals to be exchanged requires the use of multiple wire cables having a considerable cross-section, hence having considerable dimensions and weight. The connection of these cables to the structure is generally accomplished with multiple pin connectors, which are plugged into and screwed onto corresponding female connectors, affixed to the frame where the electronic circuits are located. The need to tighten or otherwise fasten these connectors conveniently demands their installation in easily accessible places and this involves a marked limitation on their application.

Moreover, the supporting frame for the female cable connectors lends a lack of uniformity to the type of structure in general is specifically provided for use with printed-circuit boards, which consists basically of a frame or box on whose wall a series of connectors for printed-circuit boards are assembled vertically, parallel to each other. Connections between the board connectors are generally provided on their reverse side by the technique known as "wire wrapping," or by insulated wires whose stripped ends are wound around connection pins borne by these connectors.

In a structure of this kind, the use of connectors of a different type, especially provided for the connecting of cables, requires the use of additional assembly panels, causing complications which increase cost and space requirements. As a consequence, a further disadvantage is that all of the cable connectors must be grouped in a single area of the structure, which conflicts with other requirements determining their distribution. In fact, external connections through cables require terminal circuits for impedance matching, amplification or regeneration of signals, these terminal circuits being mounted on printed circuit boards which should be located in close proximity to the associated cable connectors, and at the same time close to those portions of the circuits which must receive or transmit signals. This requirement is especially stringent in modern electronic equipment, where the speed of the logical operation requires that the connections between the different parts of the logical structure be as short as possible, since delay times in signal transmission on the order of a few nanoseconds, which occur in connections with a length of some tens of centimeters, become relevant.

Therefore, it is an object of the instant invention to provide improved apparatus for coupling cables to printed circuit boards.

SUMMARY OF THE INVENTION

These disadvantages are eliminated by the modular connection system of the present invention through the use of printed circuit boards provided with comb-like edge connectors for insertion into corresponding female connectors, boards which are similar in shape and material to the boards which support logic circuits of integrated and discrete components. To such boards a rigid frame, preferably metallic, is affixed, which serves as support for multiple removable cable connectors of the bayonet type or of the type provided with a ring nut to be screwed on. Connections between the fixed part of the rigid frame and the corresponding printed circuit is affected by means of insulated wires or flat flexible cables.

The rigid frame is equipped with screws, suitable for attaching to the structure supporting the boards, so as to prevent any mechanical stress of the boards and the printed board edge connectors due to the weight of the cables. In this manner contact between female connectors and corresponding board edge connectors is assured as stable and permanent. This is very advantageous, generally, and especially in those instances in which there are vibrations, as occurs in many electromechanical units used in data processing systems: such as, printers, card readers and punches, and disk units. These vibrations may in fact cause the dislocation of the boards, if cables or other heavy parts, provided with a certain mobility and relatively deformable, rest on the boards.

The modular connection system of this invention is, therefore, not only compatible with the structure of an electronic unit in which the same type of connectors and physically similar boards are used, but also with the application of the same type of connection boards to different electronic and electromechanical units.

BRIEF DESCRIPTION OF THE DRAWING

The invention will be described with reference to the accompanying drawing, wherein.

DESCRIPTION OF THE PREFERRED EMBODIMENT

Figure 1:
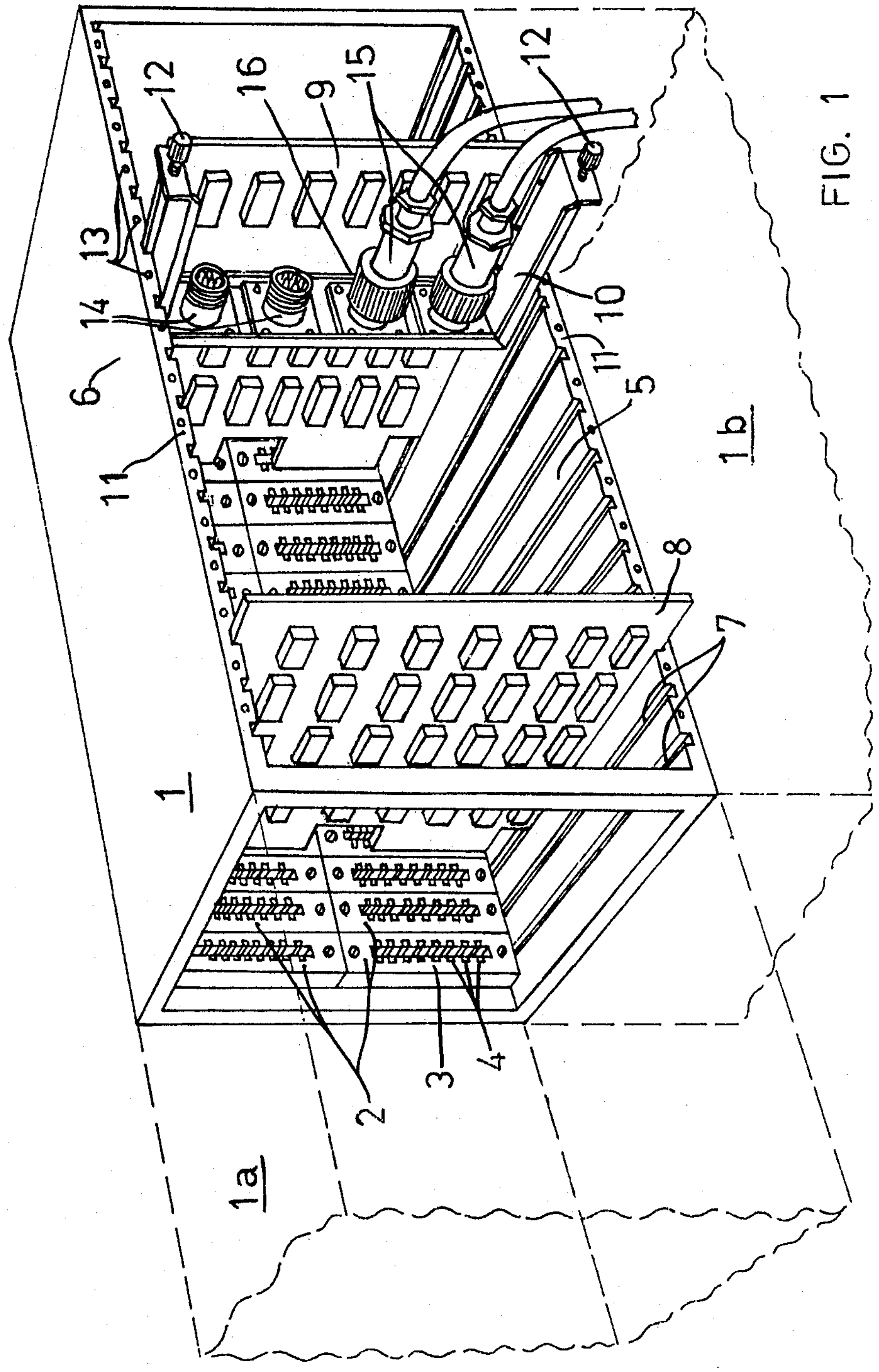
FIG. 1 is a perspective view of an arrangement of a complete modular structure according to the invention, including a support frame and a plurality of printed circuit boards.

The compatible modular connection system of the invention, shown in FIG. 1, comprises a frame 1, having the form of a parallelepiped with open front. Frame 1 is equipped at its back with a series of female connectors 2 for receiving printed boards. Each connector 2 is provided, facing the interior of the frame, with a slot 3, in which the edge connector of a board is inserted.

On the sides of a slot 3, in suitable recesses, are disposed metallic spring contact elements 4, which extend through the connector and rearwardly of it in as connecting pins, not shown. Such connecting pins are suitably connected to one another with flexible insulated wires by the soldering of the wire ends to the pins or by the simple wrapping of the wire ends around the pins according to a technique called "wire wrapping." In this manner the connections between the various printed circuit boards are effected on the back side of the frame.

A lower panel 5 and an upper panel 6 of frame 1 are provided with channels 7 facing the interior. Channels 7 are parallel and spaced equidistant, being aligned with corresponding slots 3 in the connectors. Channels 7 guide the lower and upper edges of the printed circuit boards, permitting their insertion into and extraction from corresponding connectors 2. Furthermore, channels 7 insure the correct relative positioning of the boards; preventing mutual interference and vibrations.

FIG. 1 shows a conventional printed circuit board 8, partially withdrawn from frame 1, on which a certain number of electronic components is mounted. The components on board 8 are shown in FIG. 1 to be integrated circuits in a container of the type known by the term "dual in line," although clearly any type of electronic component, discrete or integrated, may be mounted on board 8. FIG. 1 also illustrates a printed circuit board 9, also partially withdrawn from frame 1, whose function according to the invention, is to effect connection of the apparatus contained in frame 1 to other external equipment by flexible multiwire cables. Board 9 is fully compatible with the conventional boards, having the same dimensions, except possibly for the thickness of the components. Board 9 is provided with a metallic stiffening frame 10 for supporting the connectors, which can be screwed thereto. Frame 10 is suitable bent into a C-shape and affixed by means of rivets or screws to board 9. In addition, frame 10 is provided with reinforcing side wings which maintain the rigidity of the frame. The ends of frame 10 are bent outward into an L-shape so as to rest against the front edge 11 of frame 1. Such ends are rigidly fastened by means of thumb screws 12, which are screwed into corresponding openings 13, drilled into the front edge.

On the central part of the frame 10, which is suitable provided with holes, are affixed one or more connector plugs 14. Connection between the rear pins of plugs 14 and the printed circuit is accomplished by means of a flat cable, a flexible printed circuit, or simple insulated wires; i.e., with flexible elements so that possible stresses acting on a plug are not directly transferred to the printed circuit, but to frame 10. Connectors 15 are inserted into plugs 14 and provided with locking nuts 16, which are screwed onto corresponding threaded parts of plugs 14.

The insertion and removal of the connectors are preferably performed with board 9, on which plugs 14 are mounted, removed from frame 1, so as not to subject the structure to stress and to provide a maximum of operating space. In fact, when board 9 is withdrawn, the row of connectors mounted on frame 10 is easily accessible from one side, so that the screwing and unscrewing of the locking nuts and the removal and insertion of the connectors may easily be performed manually, without tools. Because connectors 15 are assembled on frame 10 in a single row, each connector is accessible independently of the others; i.e., it may be inserted or removed without the need to remove the others, even if several connection boards are positioned next to one another. It is sufficient, in fact, to withdraw only the particular board 9 on which the selected connector is located.

In this manner it is possible to obtain a density or packing of connectors which cannot be achieved with conventional structures. Moreover, clearly one of the objects of the invention is the provision of external connections in the most suitable locations of the structure. This objective is fulfilled by the options offered by the modular connection boards, which may be arranged in any desired location in frame 1 or in different frames. Thus, complex electronic systems will in fact, generally comprise a number of frames 1, arranged side-by-side and/or superposed one on top of the other, which is shown in FIG. 1, wherein the additional contiguous frames 1*a* and 1*b* are partially outlined by dashed lines.

FIG. 1 shows that the surface of the printed circuit board 9, actually occupied by mounted frame 1 for the support of plugs 14 for the respective connections, and the surface not usable because of being covered with non-removable parts, such as the connectors themselves, is much reduced in relation to the entire board surface, on which are located, as illustrated, various electronic components, integrated circuits and similar components. Therefore, on this same board it is possible to accommodate all of those circuits for amplification, matching, filtering, and generally for the transmission and reception of signals which are necessary to adjust the electric characteristics of the signals transmitted over cable to those required by the electronic system, and vice versa.

Figure 2:
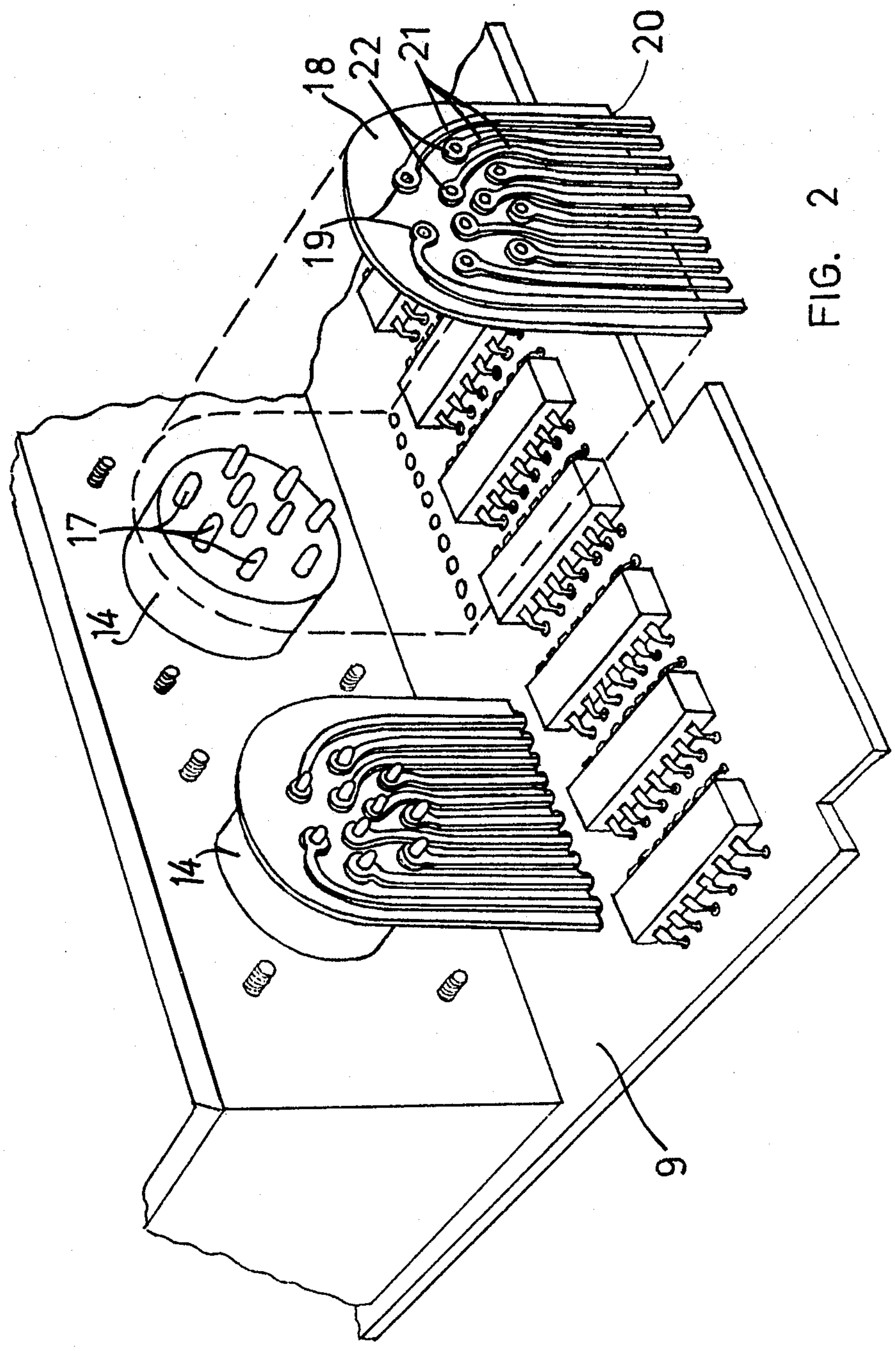
FIG. 2 is a perspective view of a printed circuit board designed for connecting to external cables.

FIG. 2 illustrates one convenient embodiment for effecting the connection between connector plugs 14 and the corresponding printed circuit board 9. Connection pins 17 extend rearwardly from plugs 14 in one type of connector plug known in the art. A printed circuit board 18, preferably flexible, is fitted onto a plug 14. Board 18 has a straight edge 20 and suitable holes 19, disposed for engaging corresponding pins 17 of plug 14. Conductors 21 are provided on board 18, according to known processes. Conductors 21 end in corresponding pads 22, each of which surrounds a hole 19 of board 18. On their opposite ends, conductors 21 extend slightly beyond straight edge 20 of the board, forming flexible and aligned pins which enter corresponding openings of board 9, permitting effecting connections to the board by known soldering techniques. Also on the plug side, the soldering of pins 17 to pads 22 may be effected by known techniques; i.e., by wave or flow soldering.

Although providing the plug-to-board connections with separate wires is possible, the use of boards 18 is preferable, because in this manner the connections are pre-established in the pattern of the board conductor and any possibility of error in the connections is eliminated. Moreover, the conductors on the boards may be accurately designed so as to strictly observe certain mutual distances and provide additional ground connections. Thus, local misadjustments or variations in the characteristic impedance of the conductors with respect to the transmission wires of the cable, a condition which causes troublesome and undesired signal reflections, are excluded or minimized. This condition is obviously possible for coaxial cables, single wire cables, or twisted-pair cables.

Figures 3, 4:
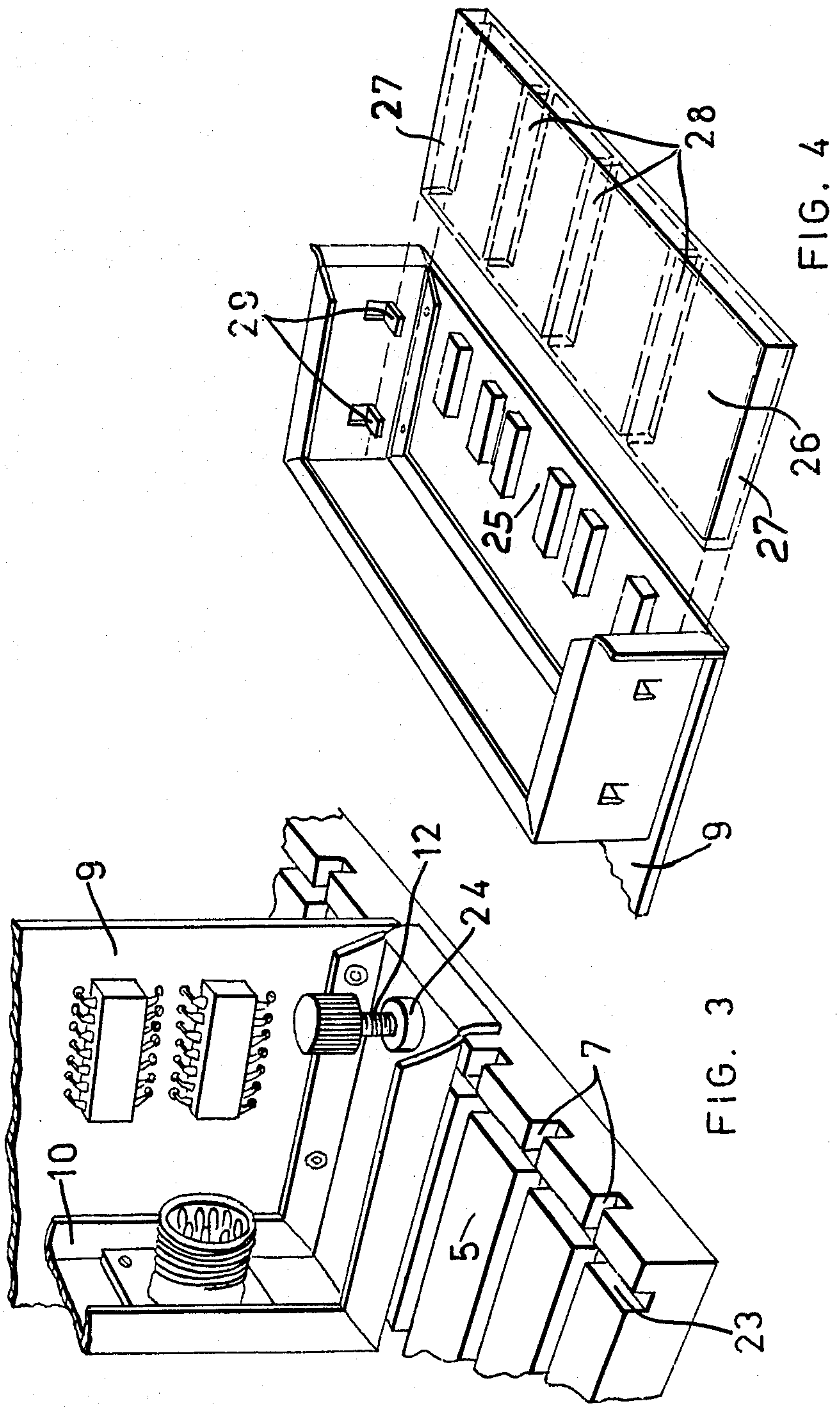
FIG. 3 illustrates a detail of the boards of FIG. 1, and in particular the preferred version for attachment to the support frame.
FIG. 4 illustrates a part for protecting the components and the board on which it is utilized.

FIG. 3 illustrates the preferred means for attaching a board 9 to a frame 1. Lower panel 5 and upper panel 6 are provided with respective grooves 23 adjacent and parallel to front edge 11. Grooves 23 are perpendicular to channels 7, in which the printed circuit boards are positioned. Each arm of frame 10 is provided with a bushing 24, installed for example by riveting through a corresponding hole in the arm. When a board 9, on which a frame 10 is mounted, rests against the upper and lower panels, a bushing 24 is in registration with a corresponding one of grooves 23. Bushing 24 is threaded internally and forms a seat for a thumb screw 12, which enters and engages in a groove 23, preventing the removal of the printed board.

Although FIG. 3 shows the attachment means only for the lower arm of a frame 10, clearly similar means is provided on the upper arm. Moreover, although a screw having a knurled knob for manual operation is shown, other means of attachment may be employed without departing from the spirit of the invention.

FIG. 4 illustrates an additional feature of the previously described connection system. It was pointed out previously herein that on the printed circuit boards, such as board 9, a substantial surface remains available for the installation of electronic components, such as integrated circuits and other components. These electronic components may also be mounted in the region 25 of the board surface opposite which are located the suspended cable connectors 15 and the corresponding cables. To avoid damage to such components as a consequence of the insertion or removal of cable connectors or because of vibrations of the suspended mechanical parts, a mechanical protective plate 26 is provided. Plate 26 may be, for example, of plexiglass, to be inserted on printed board 9 above the components. Plate 26 is shown in FIG. 4 as withdrawn from its protecting location. Side stiffening members 27 and optional intermediate ribs 28 may be provided on plate 26. Tabs 29, obtained by bending back portions of the arms of frame 10 suffice to maintain plate 26 in position. Suitable openings, if necessary, may be provided in plate 26 to permit the ventilation of the components mounted on board 9.

Much that has been described in the foregoing and that is represented on the drawing is characteristic of the invention. It is evident that one skilled in the art is able to adduce all modifications of form and of detail using his judgment, without departing from the scope of the invention.

We claim:

1. In a modular structure for electronic apparatus implemented with circuit boards, a support frame, a plurality of modular printed circuit boards each of which has an upper edge, a lower edge and an edge connector, a plurality of board connectors mounted side by side on said frame and in mating engagement with said edge connectors, guide means on said frame for supporting said printed circuit boards, said guide means being arranged in parallel order and mating the upper edge and the lower edge of said circuit boards to guide said circuit boards during insertion into said frame and said edge connectors into corresponding board connectors, at least one of said printed circuit boards being provided with a stiffening frame extending outwardly from a surface of the board and mounted on a portion of said surface spaced from said upper and lower edge to provide non-interferring engagement of said board with said guide means, at least one fixed portion of a cable connector rigidly affixed to said stiffening frame, flexible connection means disposed between said board and said connector fixed portion, and attaching means for attaching said stiffening frame to said support frame.

2. The modular structure of claim 1 wherein said guide means comprises a plurality of channels for receiving said upper edges and said lower edges of said boards in mating engagement.

3. The modular structure improvement of claim 1, wherein said flexible connection means comprises a flexible printed circuit.

4. The modular structure improvement of claim 1, wherein said stiffening frame is C-shaped, one portion of said stiffening frame being recessed relative to the front edge of said support frame and disposed parallel thereto, said recessed portion supporting said connector fixed portion, and two arms of said stiffening frame extending to said front edge, said arms being provided with said attaching means.

5. The modular structure improvement of claim 4, wherein said flexible connection means comprises a flexible printed circuit.

6. The modular structure improvement of claim 4, wherein said attaching means comprises screws engaged in suitable seats provided in said stiffening frame proximate to the front edge of said support frame.

* * * * *